(12) United States Patent  (10) Patent No.: US 7,866,974 B2
Blais et al.  (45) Date of Patent: Jan. 11, 2011

(54) MELT DISTRIBUTION APPARATUS FOR USE IN A HOT RUNNER

(75) Inventors: Paul R. Blais, South Burlington, VT (US); Edward Joseph Jenko, Essex, VT (US); John Knapp, Jeffersonville, VT (US); Martin H. Baumann, Burlington, VT (US); Manon Danielle Belzile, Fairfield, VT (US); James Osborne Plumpton, Enosburg Falls, VT (US); Patrice Fabien Gaillard, Milton, VT (US)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 318 days.

(21) Appl. No.: 12/050,224

(22) Filed: Mar. 18, 2008

(65) Prior Publication Data

US 2009/0236774 A1  Sep. 24, 2009

(51) Int. Cl.
B29C 45/23 (2006.01)
(52) U.S. Cl. .................................. 425/564; 425/572
(58) Field of Classification Search ............ 425/562, 425/563, 564, 565, 566, 572
See application file for complete search history.

(56) References Cited

U.S. PATENT DOCUMENTS

| 5,141,696 | A | 8/1992 | Osuna-Diaz |
| 5,587,188 | A | 12/1996 | Hepler |
| 5,804,231 | A | 9/1998 | Prophet et al. |
| 6,077,470 | A | 6/2000 | Beaumont |
| 6,089,468 | A | 7/2000 | Bouti |
| 6,382,528 | B1 | 5/2002 | Bouti |
| 6,464,909 | B1 * | 10/2002 | Kazmer et al. ............ 425/564 |
| 6,923,638 | B2 | 8/2005 | Chen |
| 7,037,103 | B2 | 5/2006 | Niewels |
| 7,287,977 | B2 | 10/2007 | Serniuck et al. |
| 7,306,446 | B2 * | 12/2007 | Sabin et al. ............... 425/572 |
| 2003/0012845 | A1 | 1/2003 | Doyle et al. |
| 2007/0077328 | A1 | 4/2007 | Olaru |
| 2007/0292557 | A1 | 12/2007 | Dewar et al. |

* cited by examiner

Primary Examiner—Tim Heitbrink

(57) ABSTRACT

Disclosed, amongst other things, is a melt distribution apparatus of a hot runner and a related method for balancing melt flow to a plurality of drops. The melt distribution apparatus includes a plurality of chokes with each choke of the plurality of chokes being associated with a corresponding one of a drop of a plurality of drops. Each choke of the plurality of chokes being configured to contribute, during an injection of a molding material therethrough, a choke melt-pressure loss such that the plurality of chokes contribute an aggregate choke melt-pressure loss that is generally between 10% and 75% of an aggregate hot runner melt-pressure loss.

2 Claims, 3 Drawing Sheets

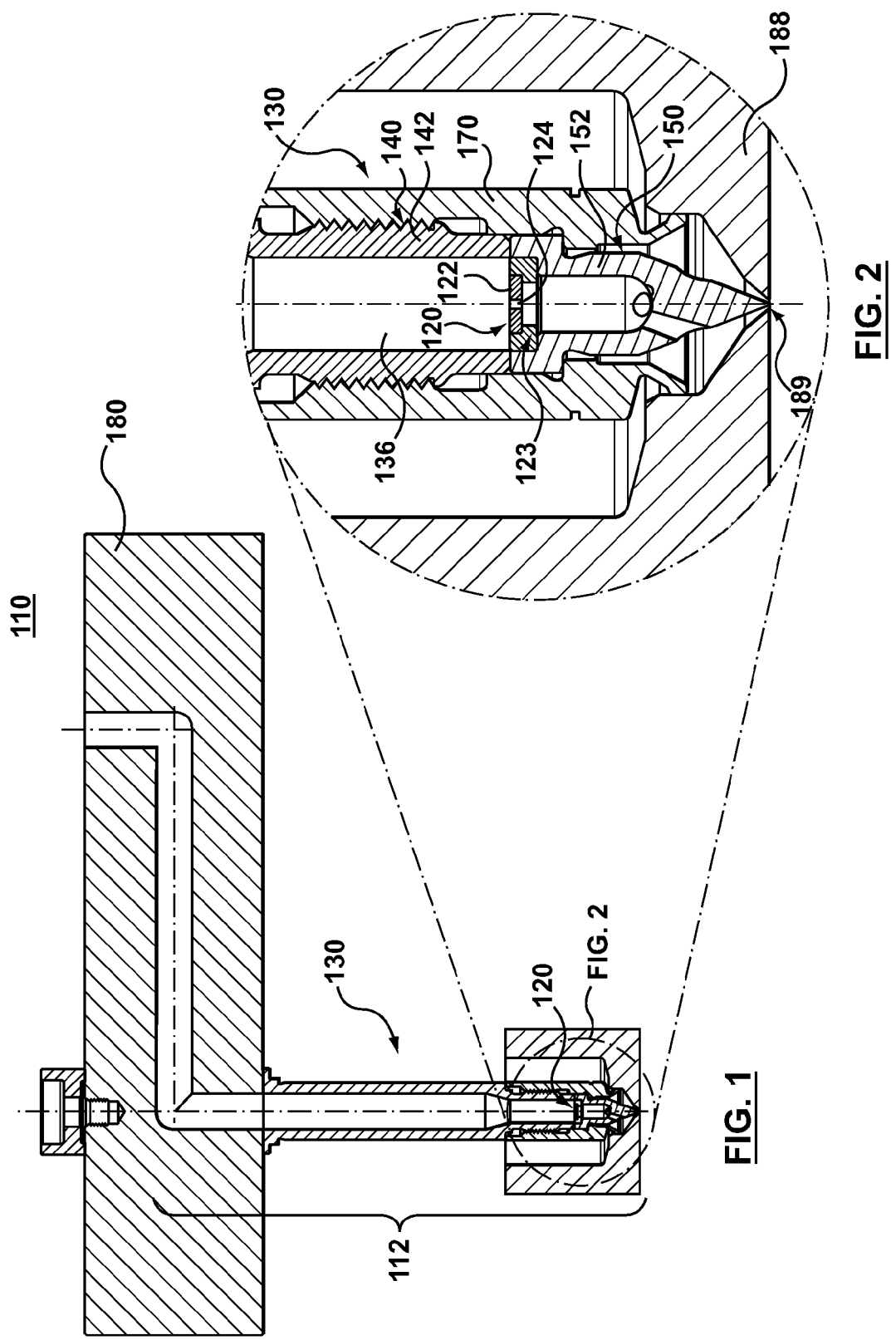

MELT DISTRIBUTION APPARATUS FOR USE IN A HOT RUNNER

FIELD OF THE INVENTION

The present invention generally relates to, but is not limited to, injection molding, and more specifically the present invention relates to, but is not limited to, a melt distribution apparatus for use in a hot runner and a related method for the configuring thereof.

BACKGROUND OF THE INVENTION

It is a goal of those skilled in hot runner design and manufacture, to attempt to configure a hot runner that will deliver a balanced melt flow to the multiple (i.e. plurality) of drops thereof. There are many design, manufacturing, and operational parameters and/or factors that may affect melt flow balance.

One way, at least in theory, to achieve a fully balanced flow to all drops of a hot runner is to make the melt-pressure (i.e. head) loss for all drops substantially identical. Melt-pressure losses in a typical hot runner include those contributed by a sprue, manifold(s), nozzles (including the housing and tip thereof) and mold gates. The melt-pressure losses through the foregoing are effected by a host of factors that include, for example, variations in melt temperature (i.e. effect of viscosity), melt channel diameter, melt channel surface roughness, melt channel length, tip geometry, and gate diameter, gate land, and tip position. With so many variables affecting melt-pressure loss it is little wonder that the prior art attempts at solving this problem have met with limited success or are complex and difficult to implement.

For example, U.S. Pat. No. 5,141,696 issued to Osuna-Diaz on Aug. 25, 1992 describes an engagement for mechanically adjusting the flow through each of a plurality of mold nozzles supplied by a manifold for a multicavity mold, to properly balance the flow into each mold cavity.

U.S. Pat. No. 6,077,470 issued to Beaumont on Jun. 20, 2000 describes a method and apparatus for balancing the filling of injection molds. The apparatus for producing molded products having balanced thermal, material and flow properties includes a device for repositioning a stream of the molten polymer containing material as it flows from a first runner into at least a second downstream runner.

U.S. Pat. No. 6,382,528 issued to Bouti on May 7, 2002 describes an injection molding mixer that reduces the flow imbalances inherent in the melt as the flow branches within a manifold or other part of the injection machine.

U.S. Pat. No. 6,923,638 issued to Chen on Aug. 2, 2005 describes an apparatus for obtaining balanced flow of hot melt in a distribution manifold. In order to achieve more simultaneous delivery, uniform fill rate, and identity of temperature of hot melt across all cavities of a multi-cavity set to achieve more uniform cooling of the preforms, restrictor pin assemblies are provided in association with certain of the branches to adjustably constrict the space available for melt flow from the runner into the branch.

U.S. Pat. No. 7,037,103 issued to Niewels on May 2, 2006 describes an improved injection molding apparatus for a mold using a valve-gated nozzle that includes a receptacle insert with a bore for aligning and sealing with the valve stem.

United States patent publication 2003/0012845 to Doyle et al. published on Jan. 16, 2003 describes an injection molding apparatus that includes an actuator, and a valve pin coupled to the actuator. The valve pin is adapted to open and close a gate of a mold and to control a rate of material flow through the gate during an injection cycle.

United States patent publication 2007/0077328 to Olaru, published on Apr. 2, 2007, describes an injection molding apparatus having a manifold and several manifold melt channels communicating with several hot runner nozzles. A melt redistribution element is placed at specific locations along the melt channels to balance the uneven shear stress profile accumulated during the flow of a melt along the manifold channels.

SUMMARY OF THE INVENTION

According to a first broad aspect of the present invention, there is provided a melt distribution apparatus of a hot runner. The melt distribution apparatus includes a plurality of chokes with each choke of the plurality of chokes being associated with a corresponding one of a drop of a plurality of drops. Each choke of the plurality of chokes being configured to contribute, during an injection of a molding material therethrough, a choke melt-pressure loss such that the plurality of chokes will contribute an aggregate choke melt-pressure loss that is generally between 10% and 75% of an aggregate hot runner melt-pressure loss.

According to a second broad aspect of the present invention, there is provided a method for balancing melt flow to a plurality of drops of a melt distribution apparatus of a hot runner. The method includes injecting a molding material through the melt distribution apparatus and choking the plurality of drops thereby introducing an aggregate choke melt-pressure loss that is generally between 10% and 75% of an aggregate hot runner melt-pressure loss.

According to a third broad aspect of the present invention, there is provided a method for configuring a melt distribution apparatus of a hot runner for use in an injection molding system. The method includes providing a plurality of chokes, each choke of the plurality of chokes being associated with a corresponding one of a drop of a plurality of drops of the melt distribution apparatus. In addition, the method includes configuring each choke of the plurality of chokes to contribute, during an injection of a molding material therethrough, a choke melt-pressure loss such that the plurality of chokes will contribute an aggregate choke melt-pressure loss that is generally between 10% and 75% of an aggregate hot runner melt-pressure loss.

A technical effect of the structure and/or steps of the present invention may include a more generally balanced melt flow through the plurality of drops as the aggregate choke melt-pressure loss overwhelms any intrinsic melt-pressure imbalances between drops of the plurality of drops.

These and other aspects and features of embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention includes alternatives and/or variations thereof may be obtained with reference to the detailed description of the exemplary embodiments along with the following drawings, in which:

FIG. 1 is a cross-section view through a portion of a melt distribution apparatus according to a non-limiting embodiment of the present invention;

FIG. 2 is an enlarged view of the portion of the melt distribution apparatus that is outlined with reference to FIG. 2;

Figure 3:
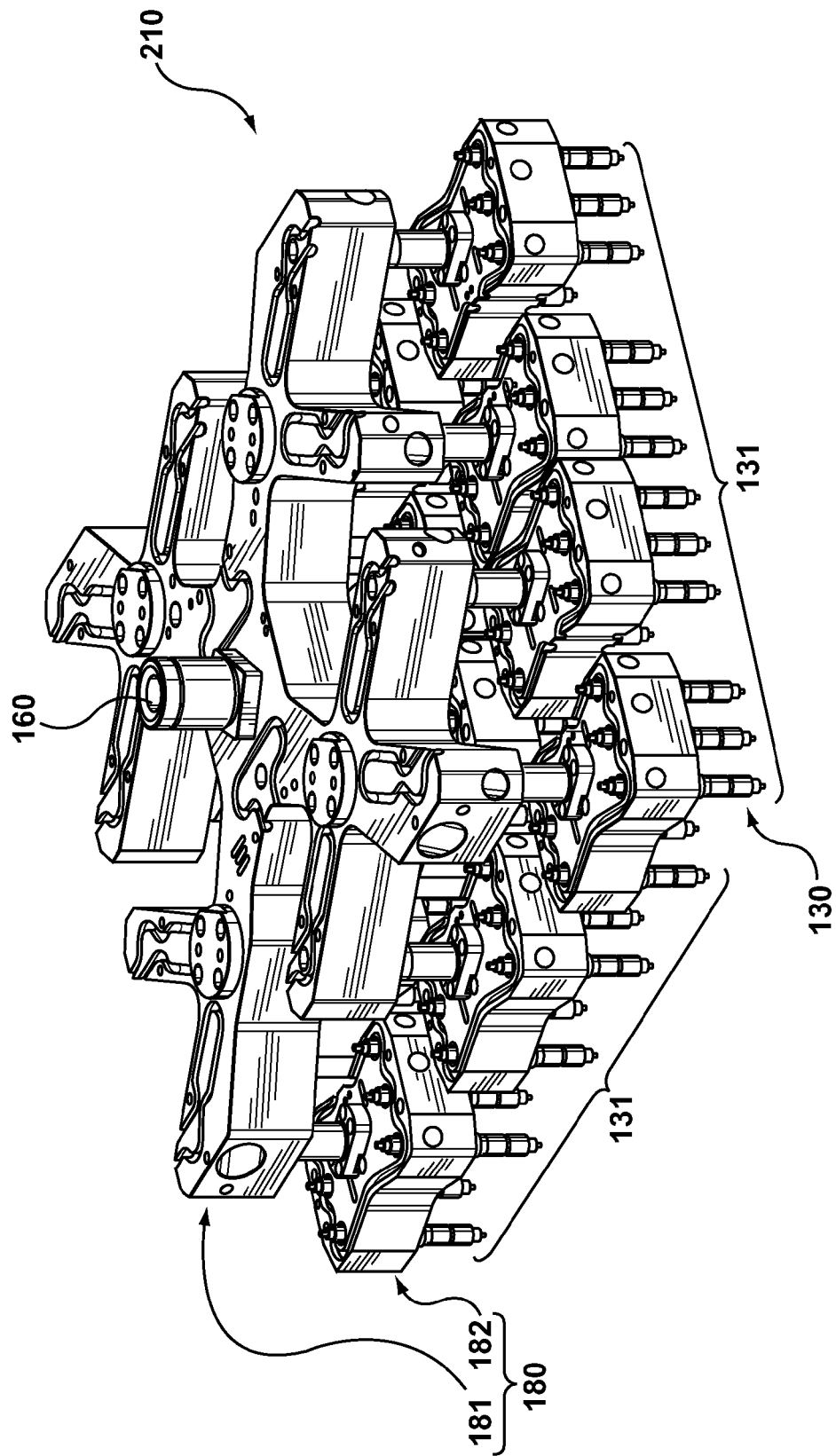
FIG. 3 is a perspective view of a melt distribution apparatus according to a further non-limiting embodiment of the present invention.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Introduction

The inventors believe that the percentage imbalance between drops of a hot runner is directly proportional to the difference of a melt-pressure loss between the drops. That is:

$$\% \text{ Imbalance} = \frac{\text{Difference in melt pressure loss between drops}}{\text{Total melt pressure loss}}$$

In the non-limiting embodiments that follow the hot runner has been configured to include a plurality of chokes with each choke of the plurality of chokes being associated with a corresponding one of a drop of a plurality of drops. The choke is a device that is static (i.e. non-movable) in operation and that serves to choke a melt channel defined in a hot runner drop. During injection of a melt of molding material, the choke serves to meter flow through the melt channel at a fixed and predictable rate (i.e a fixed pressure loss). Ideally, the melt-pressure loss through each choke of the plurality of chokes is closely matched such that they do not introduce much, if any, additional melt-pressure difference between the drops. Accordingly, the melt-pressure loss through the plurality of chokes increases the total melt-pressure loss of the hot runner but does not contribute much, if any, additional melt-pressure difference between drops. That is:

$$\% \text{ Imbalance} = \frac{\text{Difference in melt pressure loss between drops}}{\text{Total melt pressure loss} + \text{Melt pressure loss through the chokes}}$$

A technical effect of introducing the choke to each drop is to introduce an additional melt-pressure loss that overwhelms the melt-pressure losses associated with some of the factors that contribute to the flow imbalance to the plurality of drops (i.e. the factor-induced melt pressure losses become relatively insignificant or negligible).

Non-Limiting Embodiments of a Melt Distribution Apparatus

With reference to FIGS. 1 and 2 a non-limiting embodiment of a melt distribution apparatus 110 for use in a hot runner is shown. The melt distribution apparatus 110 includes a plurality of drops and a plurality of chokes. Only a representative one of a drop 112 and a choke 120 of the plurality of drops and the plurality of chokes, respectively, are shown. As shown, the representative choke 120 is associated with the representative drop 112. Similarly, each choke 120 of the plurality of chokes is associated with a corresponding one of a drop 112 of the plurality of drops. Each choke 120 of the plurality of chokes is configured to contribute, during an injection of a molding material therethrough, a choke melt-pressure loss such that the plurality of chokes contribute an aggregate choke melt-pressure loss that is generally between 10% and 75% of an aggregate hot runner melt-pressure loss. In further non-limiting embodiments, the aggregate choke melt-pressure loss is generally between 25% and 66%. In yet another non-limiting embodiment, the aggregate choke melt-pressure loss is about 66% of the aggregate hot runner melt-pressure loss of the hot runner. In so doing, the aggregate choke melt-pressure loss overwhelms any intrinsic melt-pressure imbalances between drops of the plurality of drops wherein a technical effect of a more generally balanced melt flow through the plurality of drops may be realized.

The melt distribution apparatus 110 may also include a plurality of nozzles. As shown, each choke 120 of the plurality of chokes is associated with a corresponding one of a drop 112 of a plurality of drops. For sake of illustrating such a plurality of nozzles, a further embodiment of a melt distribution apparatus 210 is shown with reference to FIG. 3. The melt distribution apparatus 210 depicts quite clearly a typical arrangement of a plurality of nozzles 131. Each nozzle 130 of the plurality of nozzles 131 is configured to provide a nozzle portion of the plurality of drops. Referring back to FIG. 2, it is shown that each nozzle 130 of the plurality of nozzles 131 includes a housing member 140 and a tip member 150. A retainer 170 couples the tip member 150 to the housing member 140. The housing member 140 is configured to contribute, during the injection of the molding material therethrough, a housing melt-pressure loss. Likewise, the tip member 150 is configured to contribute, during the injection of the molding material therethrough, a tip melt-pressure loss. Accordingly, a nozzle melt-pressure loss through each nozzle 130 of the plurality of nozzles 131 is a sum of the housing melt-pressure loss, the tip melt-pressure loss. The aggregate hot runner melt-pressure loss includes a summation of each nozzle melt-pressure loss of the plurality of nozzles 131.

In the non-limiting embodiment of FIG. 3, the plurality of chokes is associated with the plurality of nozzles 131. Accordingly, the nozzle melt-pressure loss through each nozzle 130 of the plurality of nozzles 131 further includes the choke melt-pressure loss.

With reference to FIG. 2, each choke 120 of the plurality of chokes may be defined as a constricted melt channel 124 that is defined in a choke body 122. Each choke 120 may be constructed from a material that is compatible with the melt of molding material. The material may include, for example, wear resistant materials such as a ruby body, a diamond body, a ceramic body, or a carbide body.

For best results, a deviation in the choke melt-pressure loss between chokes of the plurality of chokes should be less than about 1.5%. Ideally, the deviation should be less than 1.3%. The choke melt-pressure loss of each choke 120 of the plurality of chokes may be precisely established through careful manufacturing wherein at least one of the length and diameter of the constricted melt channel 124 is precisely controlled.

In the non-limiting embodiment of FIG. 2, each choke 120 of the plurality of chokes is arranged between the housing member 140 and the tip member 150 of each nozzle 130 of the plurality of nozzles 131. More particularly, each choke 120 is arranged in an adapter member 123 that is pressed into a seat defined in the tip body 152, the seat positioned adjacent an interface between the tip member 150 and the housing member 140. The constricted melt channel 124 so arranged fluidly couples a nozzle melt channel 136 that is defined, at least in part, through the housing and tip members.

In a further non-limiting embodiment, not shown, each choke 120 of the plurality of chokes may be arranged within one of the housing member 140 and the tip member 150 of each nozzle 130 of the plurality of nozzles 131.

In a further non-limiting embodiment, not shown, each choke 120 of the plurality of chokes may be configured as a constricted melt channel 124 that is defined on at least one of a housing body 142, of the housing member 140, and/or a tip body 152, of the tip member 150. The constricted melt channel 124 fluidly couples, in use, with a nozzle melt channel 136 that is defined, at least in part, in the housing body 142 and the tip body 152.

Referring back to the non-limiting embodiment of FIG. 2, the melt distribution apparatus 210 may further include a sprue 160, as is typical in a hot runner. The sprue 160 also contributes, during the injection of the molding material therethrough, a sprue melt-pressure loss. The aggregate hot runner melt-pressure loss further includes the sprue melt-pressure loss.

Figure 4:
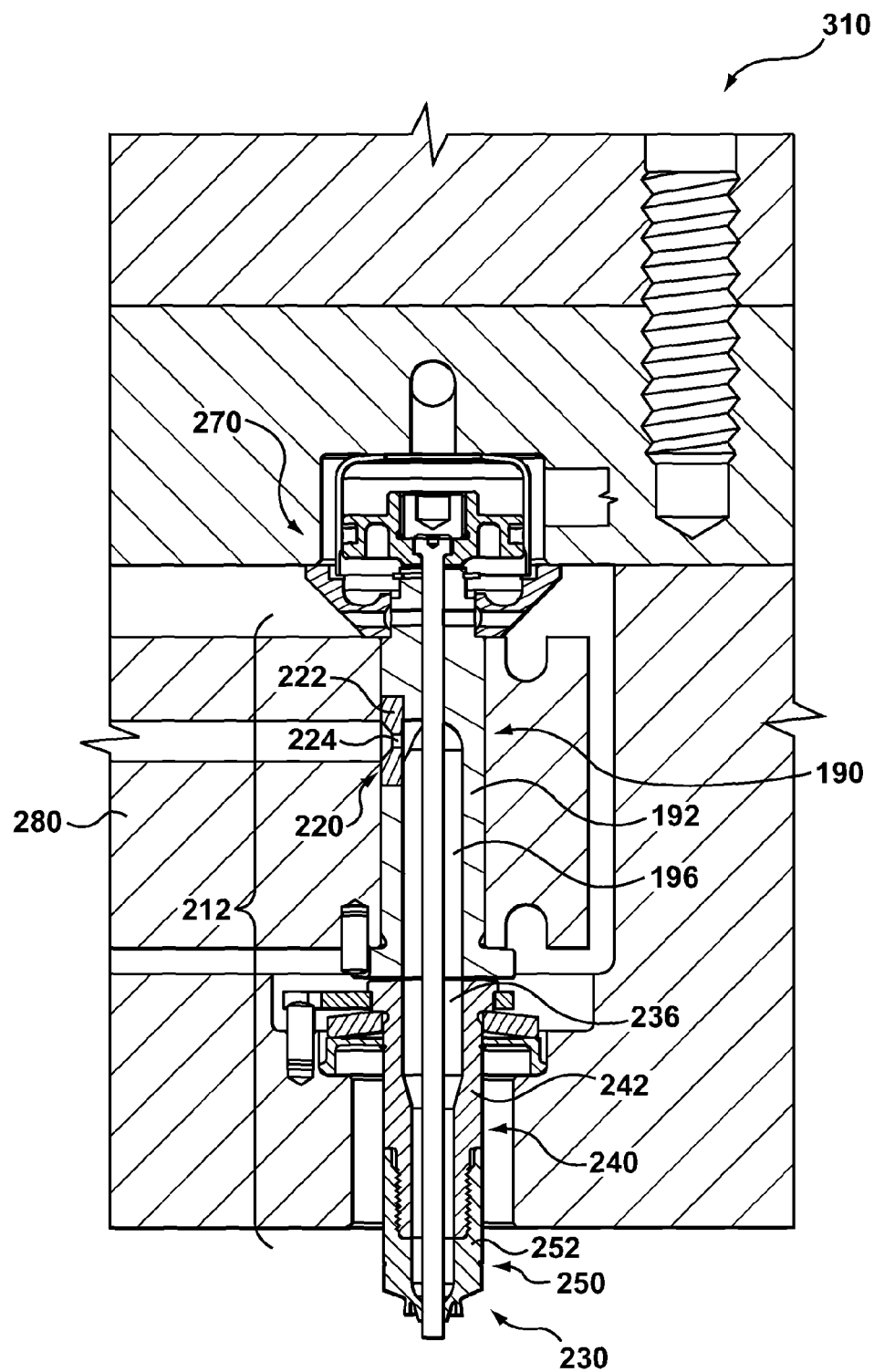
FIG. 4 is a cross-section view through a portion of a melt distribution apparatus according to yet another non-limiting embodiment of the present invention.

Likewise, the non-limiting embodiments of the melt distribution apparatus 110, 210, 310 of any of FIGS. 1, 3, and a further alternative embodiment of FIG. 4 may further include a manifold 180 or 280. The manifold 180, 280 define a network of melt channels (not shown) for connecting the sprue to the plurality of drops. In the melt distribution apparatus 210 depicted in FIG. 3, the manifold 180 is a collection of sub-manifolds 181, and 182. The particulars of construction and operation of such a manifold 180, 280 is well known to the skilled reader and hence will not be described further herein. The manifold 180, 280 also contribute, during the injection of the molding material therethrough, a manifold melt-pressure loss. The aggregate hot runner melt-pressure loss further includes the manifold melt-pressure loss.

In the non-limiting embodiments, a network of melt channels defined in the manifold 180, 280 are geometrically balanced (i.e. the dimensions of the melt channels connecting each drop to the sprue are the same). However, in accordance with a further non-limiting embodiment, not shown, at least a portion of the network of melt channels between an inlet and the plurality of drops may not be geometrically balanced.

The melt distribution apparatus 310 may further include a plurality of manifold bushings. With reference to the non-limiting embodiment of FIG. 4, each manifold bushing 190 of the plurality of manifold bushings may be associated with each drop of the plurality of drops. Each manifold bushing 190 of the plurality of manifold bushings are configured to provide a bushing portion of the plurality of drops. Each manifold bushing 190 is further configured to cooperate with a valve stem apparatus 270. The valve apparatus 270 includes an actuator and a valve member. The valve stem is operatively movable by the actuator, in use, for controlling melt flow through each nozzle 230. The particulars of construction and operation of such a valve apparatus 270 is well known to the skilled reader and hence will not be described further herein. Each manifold bushing 190 is configured to contribute, during the injection of the molding material therethrough, a bushing melt-pressure loss. Accordingly, the aggregate hot runner melt-pressure loss further includes a sum of each bushing melt-pressure loss of the plurality of manifold bushings.

In the non-limiting embodiment, each choke 220 of the plurality of chokes are associated with the corresponding manifold bushing 190 of the plurality of manifold bushings. Accordingly, the bushing melt-pressure loss through each manifold bushing 190 of the plurality of manifold bushings would further include the choke melt-pressure loss. More particularly, each choke 220 of the plurality of chokes is arranged within each manifold bushing 190 of the plurality of manifold bushings. The constricted melt channel 124 fluidly couples with a bushing melt channel 196 that is defined, at least in part, in each manifold bushing 190.

In a further non-limiting embodiment, not shown, each choke 220 of the plurality of chokes may be provided as a constricted melt channel 224 that is defined on a bushing body 192 of each manifold bushing 190 of the plurality of manifold bushings. The constricted melt channel 224 fluidly couples with a bushing melt channel 196 that is defined, at least in part, by the bushing body 192.

While not shown in FIG. 1 or 2, the melt distribution apparatus 110 may also include a plurality of gate inserts. As shown, each gate insert 188 of the plurality of gate inserts may be associated with a corresponding one of each drop of the plurality of drops in the melt distribution apparatus. Each gate insert 188 of the plurality of gate inserts is configured to define a gate portion of the plurality of drops. Each gate portion fluidly couples, during the injection of the molding material therethrough, each drop to a molding cavity (not shown) of a plurality of molding cavities (not shown). The gate portion is configured to contribute, during the injection of the molding material therethrough, a gate melt-pressure loss.

In a further non-limiting embodiment, not shown, the plurality of chokes may be associated with the plurality of gate inserts. Accordingly, the gate melt-pressure loss through each gate insert 188 (i.e. the gate portion thereof) of the plurality of gate inserts would further include the choke melt-pressure loss, and likewise the aggregate hot runner melt-pressure loss would further include the gate melt-pressure loss.

In terms of the association of the plurality of chokes with the plurality of gate inserts, it is possible that each choke 120 of the plurality of chokes may be defined as a constricted melt channel 124 that is defined in a choke body 122, as described previously, and further that the choke body of each choke 120 is arranged in, or adjacent, a gate melt channel 189 (i.e. gate portion) of a corresponding gate insert 188 of the plurality of gate inserts. Alternatively, it is possible that each choke 120 of the plurality of chokes may be defined along at least a portion of the gate melt channel 189. That is, the body that defines the gate melt channel 189 also defines the constricted melt channel of the choke—more particularly, the gate melt channel 189 and the constricted melt channel may be one and the same structure. The foregoing requires that the combination gate melt channel 189 and the constricted melt channel (henceforth gate orifice) is to be made more consistent and deliberately than the current art advocates—recalling that for best results the deviation between choke melt-pressure loss between chokes of the plurality of chokes should not exceed 1.5%, and more ideally, that the deviation should be less than 1.3%. Put differently, if the components of the gate orifice (i.e. gate diameter and/or land) are constructed such that each gate orifice induces substantially the same melt-pressure loss, then the mold balance will be improved.

As shown in any of the non-limiting embodiments of FIG. 1, 2, or 4, the constricted melt channel 124, 224 is defined as a single cylindrical channel. The configuration of the constricted melt channel 124, 224 is however not so limited in terms of shape or in number (i.e. could be one or more cylindrical channels). For example, in a further non-limiting embodiment, not shown, the form of the constricted melt channel may be defined in the form of a slot, a slit, or an annular orifice.

In yet another non-limiting embodiment, the melt plurality of chokes may include a first subset having an adjusted choke melt-pressure loss that is different than the choke melt-pressure loss of a remainder of the plurality of chokes. So configured, the plurality of drops of the hot runner may have an intentional, but controlled, melt flow imbalance.

Details of an Experimental Melt Distribution Apparatus

The inventors built and tested an experimental hot runner (not shown) that included the melt distribution apparatus 110 of FIG. 1. The experimental hot runner had four drops, each drop including a U500 HT nozzle from Husky Injection Molding Systems Limited. Each nozzle defined a nozzle melt channel 136 that was 5 mm in diameter. The experimental hot runner was coupled to a 4 cavity closure mold (not shown). Various chokes were tested in combination with the nozzles. Each choke 120 in the experimental hot runner were provided by a 'precision orifice' from Bird Precision, Inc. One such 'precision orifice' tested had a constricted melt channel 124 provided as a single cylindrical channel with a diameter of 0.635 mm (0.025 inch) and a length of 0.660 mm (0.026 inch) that was defined in a ruby body. The results from a representative set of tests showed an improvement in the melt flow imbalance from about 85%, when testing without the 'precise orifices' installed, to about 89%, with the 'precision orifice' installed in each nozzle. Accompanying the foregoing test was an increase in injection pressure from 103.4 MPa (15,000 PSI) to 172.37 MPa (25,000 PSI).

Other configurations of the foregoing 'precision orifice' tested included those having a single cylindrical channel of sizes ranging from 0.254 mm (0.010 inch) to the afore mentioned 0.635 mm (0.025 inch). In each test the melt flow imbalance between the drops was significantly improved. With the smaller orifice sizes there is an associated requirement of increasing injection pressure. Accordingly, the choke body 122 may be made longer to increase the integrity thereof and thereby handle the higher injection pressure.

Method of Balancing Melt Flow

Related to the foregoing is a method for balancing melt flow to a plurality of drops of a melt distribution apparatus, such as may be practised, for example, with the non-limiting embodiments of the melt distribution apparatus 110, 210, 310 discussed previously. The method includes injecting a molding material through the melt distribution apparatus 110, 210, 310, and further choking the plurality of drops thereby introducing an aggregate choke melt-pressure loss that is generally between 10% and 75% of an aggregate hot runner melt-pressure loss. In so doing, the aggregate choke melt-pressure loss overwhelms any intrinsic melt-pressure imbalances between drops of the plurality of drops wherein a technical effect of a more generally balanced melt flow through the plurality of drops may be realized.

In accordance with another non-limiting embodiment, the method is similar to the foregoing however the choking of the plurality of drops introduces the aggregate choke melt-pressure loss that is generally between 25% and 66% of the aggregate hot runner melt-pressure loss of the hot runner.

In accordance with another non-limiting embodiment, the method is similar to the foregoing however the choking of the plurality of drops introduces the aggregate choke melt-pressure loss that is about 66% of the aggregate hot runner melt-pressure loss of the hot runner.

In accordance with another non-limiting embodiment, the method is similar to the foregoing however the choking of the plurality of drops introduces a deviation in a choke melt-pressure loss between drops of the plurality of drops that is less than about 1.5%.

In accordance with another non-limiting embodiment, the method is similar to the foregoing however the choking of the plurality of drops introduces a deviation in a choke melt-pressure loss between drops of the plurality of drops that is less than about 1.3%.

Method for Configuring a Melt Distribution Apparatus

Also related to the foregoing is a method for configuring a melt distribution apparatus of a hot runner for use in an injection molding system, such as, for example, the non-limiting embodiments of the melt distribution apparatus 110, 210, 310 discussed previously. The method includes providing a plurality of chokes, each choke of the plurality of chokes being associated with a corresponding one of a drop of a plurality of drops. In addition, the method includes configuring each choke of the plurality of chokes to contribute, during an injection of a molding material therethrough, a choke melt-pressure loss such that the plurality of chokes will contribute an aggregate choke melt-pressure loss that is generally between 10% and 75% of an aggregate hot runner melt-pressure loss. In so doing, the aggregate choke melt-pressure loss overwhelms any intrinsic melt-pressure imbalances between drops of the plurality of drops wherein a technical effect of a more generally balanced melt flow through the plurality of drops may be realized.

The method may further include flow testing each of the choke 120, 220 of the plurality of chokes to determine an actual choke melt-pressure loss therethrough. And, in addition, adjusting any of the choke 120, 220 of the plurality of chokes with the actual choke melt-pressure loss therethrough being outside a first predetermined range of choke melt-pressure loss. In so doing, balancing of the choke melt-pressure loss through each choke 120, 220 of the plurality of chokes is provided.

Likewise, the method may include further flow testing each of the choke 120, 220 of the plurality of chokes to determine a corrected choke melt-pressure loss therethrough. And, in addition, further adjusting any of the choke 120, 220 of the plurality of chokes with the corrected choke melt-pressure loss therethrough being outside a second predetermined range of choke melt-pressure loss, wherein the second predetermined range of choke melt-pressure loss is smaller than the first predetermined range of choke melt-pressure loss. In so doing, balancing of the choke melt-pressure loss through each choke of the plurality of chokes is further improved.

The adjusting any of the choke 120, 220 of the plurality of chokes may include, for example, modifying the geometry of a constricted melt channel 124, 224 thereof.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

What is claimed is:

1. A melt distribution apparatus of a hot runner, comprising:
   a plurality of chokes each being associated with a corresponding one of a drop of a plurality of drops;
   each choke of the plurality of chokes being configured to contribute, during an injection of a molding material therethrough, a choke melt-pressure loss such that the plurality of chokes will contribute an aggregate choke melt-pressure loss that is generally between 10% and 75% of an aggregate hot runner melt-pressure loss;
   whereby the aggregate choke melt-pressure loss so configured overwhelms any intrinsic melt-pressure imbalances between drops of the plurality of drops for a more generally balanced melt flow through the plurality of drops,
   wherein the plurality of chokes are static and non-movable devices in operation, and the plurality of chokes serve to choke a melt channel defined in with a corresponding one of a drop of the plurality of drops, and during injection of a melt of molding material, the plurality of chokes serve to meter flow through melt channels at a fixed and predictable rate,
   wherein:
   said each choke of the plurality of chokes is arranged between a housing member and a tip member of each nozzle of a plurality of nozzles, and
   said each choke is arranged in an adapter member that is pressed into a seat defined in a tip body, the seat is positioned adjacent an interface between the tip member and the housing member.

2. A melt distribution apparatus of a hot runner, comprising:
   a plurality of chokes each being associated with a corresponding one of a drop of a plurality of drops;
   each choke of the plurality of chokes being configured to contribute, during an injection of a molding material therethrough, a choke melt-pressure loss such that the plurality of chokes will contribute an aggregate choke melt-pressure loss that is generally between 10% and 75% of an aggregate hot runner melt-pressure loss;
   whereby the aggregate choke melt-pressure loss so configured overwhelms any intrinsic melt-pressure imbalances between drops of the plurality of drops for a more generally balanced melt flow through the plurality of drops,
   wherein the plurality of chokes are static and non-movable devices in operation, and the plurality of chokes serve to choke a melt channel defined in with a corresponding one of a drop of the plurality of drops, and during injection of a melt of molding material, the plurality of chokes serve to meter flow through melt channels at a fixed and predictable rate,
   wherein:
   said each choke of the plurality of chokes is provided as a constricted melt channel that is defined on a bushing body of each manifold bushing of a plurality of manifold bushings, and
   the constricted melt channel, in use, fluidly couples with a bushing melt channel that is defined, at least in part, by the bushing body.

* * * * *